United States Patent [19]
Manicatide et al.

[11] 3,777,978
[45] Dec. 11, 1973

[54] AERIAL DISTRIBUTOR FOR PARTICULATE MATERIALS

[75] Inventors: Radu Adrian M. Manicatide; Ion Olteanu; Petre Georgescu, all of Bucarest, Romania

[73] Assignee: Institutul de Mecanica Fluidelor si Constructii Aerospatiale, Bucarest, Romania

[22] Filed: Mar. 31, 1972

[21] Appl. No.: 240,154

[30] Foreign Application Priority Data
Apr. 5, 1971  Romania .............................. 66479

[52] U.S. Cl. ................. 239/171, 244/136, 267/136,
[51] Int. Cl. .......................................... B05b 17/02
[58] Field of Search ...................... 239/171; 244/136 267/136

[56] References Cited
UNITED STATES PATENTS
| | | | |
|---|---|---|---|
| 2,924,040 | 2/1960 | White et al. ..................... | 239/171 X |
| 3,443,528 | 5/1969 | Lipsius et al. .................... | 267/136 X |
| 2,626,769 | 1/1953 | Wadman ............................ | 244/136 |
| 2,986,360 | 5/1961 | Rutten ............................ | 239/171 X |
| 3,204,895 | 9/1965 | Razak .............................. | 244/136 |
| 3,204,896 | 9/1965 | Smith et al. .................... | 244/136 |
| 3,476,337 | 11/1969 | Cornett, Jr. .................... | 239/171 X |

*Primary Examiner*—M. Henson Wood, Jr.
*Assistant Examiner*—Michael Y. Mar
*Attorney*—Karl F. Ross

[57] ABSTRACT

The invention refers to a device and apparatus for the aerial spreading of solid materials, in powder and granular form.

The device consists of a receptacle for the materials to be dispersed, in the form of a shallow box, open in the front and back, the upper face of which is traversed by a cylindrical mouth with a lid. The lid, with a joint, is controlled by means of a rod. A diffuser is united to the box and is horizontally flared and divided by vertical walls into flow channels which widen. Pivoting shutters, on the walls, permit the control of the transverse distribution.

The equipment comprises a tank for materials, of somewhat tapered form elastically supported in the plane fuselage and connected to the cylindrical mouth.

5 Claims, 4 Drawing Figures

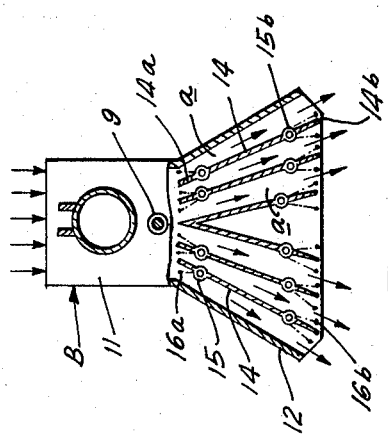
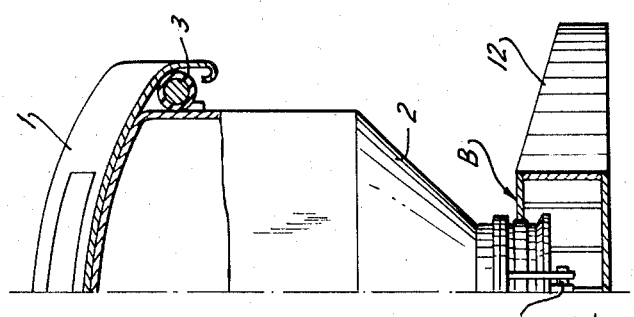
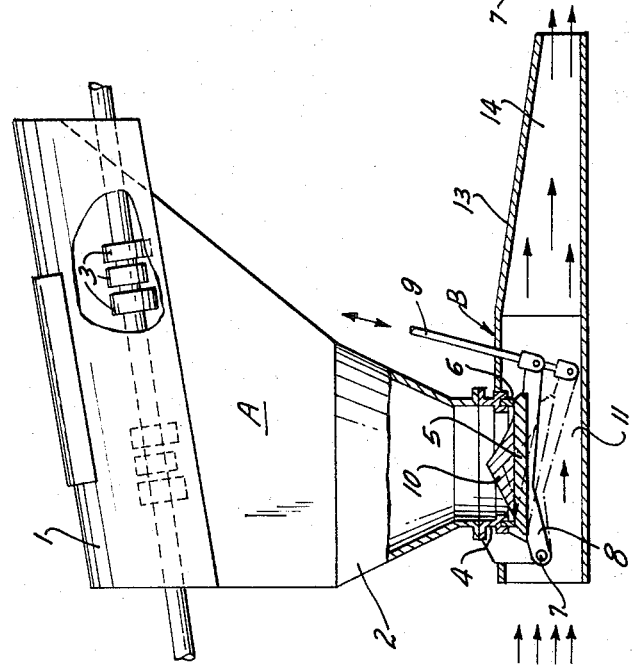

AERIAL DISTRIBUTOR FOR PARTICULATE MATERIALS

FIELD OF THE INVENTION

The present invention relates to apparatus for the aerial spreading of solid materials, such as powders, granules, seeds, etc., for soil fertilization, pest control, sowing, fire control, etc.

BACKGROUND OF THE INVENTION

Several types of apparatus are known for the spreading of chemical fertilizers from an airplane, which use, as a rule, a Venturi tube, located at the lower part of the airplane fuselage; the fertilizers fall from a hopper past an obturator into a duct; where they are carried off and dispersed by an air current, which passes through the tube.

Such apparatus has the disadvantage that in the accelerated air current, the various particles receive relatively small unequal energies over the cross section of the tube, so that the strip of soil treated during each pass is relatively narrow and fertilizers are dispersed irregularly within the width of the soil strip.

There is known also another fertilizer distributor, which comprises, in general, a conical or tapering funnel, into which is introduced the fertilizer to be sperad; at the base of the funnel there is located a distributing mechanism consisting of a distributing plate rotated by means of a slide block or by a series of gears.

This distributor has several disadvantages. First, the load of fertilizers contained in the funnel is applied directly onto the distributing plate and impedes rotation. If the drive of the distributing plate is ensured through a slide block, the latter spinds on the distributor plate, while if driving takes place through the agency of a train of gears, there is frequent breakage of the driving shaft. Besides, the distributor requires a high power consumption from the motor and, because due to the mechanism works continuously in the presence of chemicals, it readily becomes defective.

OBJECT OF THE INVENTION

The present invention has as its object to provide apparatus for the aerial spreading of particulate solid materials, in the form of powders, granules, seeds, etc., which obviates the above mentioned drawbacks.

SUMMARY OF THE INVENTION

The device, according to the invention, comprises a receptacle for the materials to be spread, and a distributor, traversed by an air current in the flying direction.

The receptacle comprises a horizontal parallelepiped-shaped box, open at its front and back, and whose upper face is connected to a cylindrical mouth of a hopper, closed by a lid with an adjustable and directed opening, smallest in the front, larger in the sides and largest at the back. The lid is provided with a packing piece and is articulated at a hinge at the front of the opening, with the hinge axis thereof disposed ahead of the opening in the flying direction, and below the mouth.; the lid is actuated by the pilot, by means of an external rod articulated either to a bar or to an extension, fixed beneath the lid. The lid may be provided with a distributing fairing of a low conical shape, the side face of which is straight and which is possibly curved at the back. The straight may have, by replacement of the fairing, various slopes, ranging from 10 to 40 percent. The curved part may have various profiles, that can influence the flow characteristics of the materials, according to requirements.

The back of the parallellepiped-shaped box is connected to the distributing part of the device which contains a diffuser (i.e., an outwardly flared outlet), which is traversed by air, in the flying direction; the diffuser comprises a low box flaring in the direction of air flow The bottom of the box is in prolongation of that of the horizontal parallellepiped-shaped box.

Internally, the diffuser is provided with vertical walls, which are fastened only to its bottom and which are disposed in the form of a fan, form flowing channels which widen horizontally in the direction of flow of the air and of the particulate materials.

The control of the emergent jets of materials, with a view to obtaining uniform diagrams of the transversal distribution of the materials, is achieved by means of shutters, which are mounted at the front and back of each wall, the shutters pivot about axes and may be fixed in various positions.

DESCRIPTION OF THE DRAWING

FIG. 1 is a side view of the apparatus, with material tank and spreading device, partially sectioned and broken away;

FIG. 2 is a partial front view of the equipment shown in FIG. 1, partially sectioned;

FIG. 3 is a top view of the spreading device, partially sectioned, showing the internal walls and the respective channels; and FIG. 4 is a side view of the distributing fairing mounted on the conical lid.

SPECIFIC DESCRIPTION

The equipment, according to the invention, comprises a tank or hopper A for solid materials (powders, granules, seeds) and a spreading device B. The tank A is located in the fuselage and consists of an upper part 1, consituting the very back of the fuselage. The hopper A has a somewhat tapered lower part 2, which hangs down from the fuselage, being flexibly supported by a row of dampers 3, located on each part. The conical body 2 of the hopper is connected, at its lower end, to a cylindrical mouth 4, of the aerial spreading device. This device comprises, in its receptacle 11, the cylindrical mouth 4, which is closed by an internal lid 5, provided with a packing (sealing) piece 6. The lid is articulated at a hinge 7. The axis thereof is arranged in a forward position in the direction of flying, and is below the plane of the mouth.

The tapered lid 5 is supported and connected to hinge 7, by a bar or other extension structure 8.

The opening and closing of the lid is accomplished manually, by the pilot, by means of a rod 9, articulated to the bar 8.

Over the lid 5 is placed a fairing 10, of a low, somewhat conical shape; its lateral face is a straight surface (defined by straight line generatrices), possibly curved at its back part, relative to the flying direction. The curved surface may have various profiles, which can change the flow characteristics of the dispersed materials, according to requirements. The device has a set of fairings of various slopes (of the straight part), comprised between 10 and 40 percent, of which one selects the configuration which meets the spreading conditions desired.

The material flows into the horizontal parallelepiped-shaped receptacle 11, under the conditions imposed by the fairing 10 and by adjustable opening of the lid 5, which opening is smaller in the front, larger at the sides and largest at the back. The receptacle 11 is open in the front, in the flying direction, as well as in the back, so that it is traversed by the air.

To the back part of the receptacle 11 is connected the distribution part of the device B; which constitutes a diffuser 12, traversed, by air.

The diffuser 12 is horizontally flared and vertically tapered towards the back part; its bottom is in extension of the bottom of the receptacle 11 and is provided above with an inclined top 13.

Inside the diffuser 12 are provided vertical walls 14, fixed only to the diffuser bottom and to the inclined top 13. The walls 14 are distributed in the shape of a fan and form flow channels a, enlarged towards the outlet, in the distribution direction of the air and of the materials.

The leading and trailing parts of these walls 14 are constituted of shutters 14 a and 14 b, respectively, which are pivoted around pins 15 a and 15 b, respectively; these shutters can be fixed in various positions, by means of rods 16 a and 16 b, respectively, to the bottom of the diffuser 12. By shifting of these shutters one can vary the flow cross sections for the entrance of the air and particulate materials into the distributor, in order to obtain the desired diagrams of the transversal spreading of the materials.

We claim:

1. An apparatus for the aerial distribution of a particulate material comprising:
    a generally parallelopipedal receptacle open at its front and back to permit a current of air to flow through said receptacle upon the aerial entrainment of the apparatus;
    a mouth opening into said receptacle at the top thereof for delivering said material into said receptacle;
    a lid hingedly mounted in said receptacle and juxtaposed with said mouth, said lid being shiftable to vary the opening defined between said mouth and said lid with the opening being smallest toward the front, larger at its sides and largest toward the back;
    a diffusor connected to said receptacle at the back thereof and traversed by air passing through said receptacle, said diffusor flaring outwardly away from said receptacle; and
    a plurality of vertical walls extending within said diffusor from the front to the back thereof and subdividing said diffusor horizontally into distribution channels widening horizontally away from said receptacle.

2. The apparatus defined in claim 1 wherein said mouth is cylindrical and lies in a plane, said lid being pivotally mounted in said receptacle at an axis disposed below the plane of said mouth and forwardly thereof, said lid being formed with a generally conical distributing fairing extending toward said mouth and having a forward portion formed of straight line generatrices, and a curved after portion.

3. The apparatus defined in claim 2 wherein said fairing is replaceably mounted on said lid and constitutes one of a set of fairings whose straight line generatrices at said forward portion have slopes ranging between 10 to 40 percent and varying after-portion profiles, the fairings of said set being interchangeably positionable on said lid.

4. The apparatus defined in claim 1 wherein the front and rear of each of said walls is provided with a shutter pivoted about a respective axis, said apparatus further comprising means for selectively fixing said shutters at respective positions about their axes to achieve a desired distribution of the material.

5. The apparatus defined in claim 1 further comprising a hopper for said material communicating with said mouth, and means for flexibly anchoring said hopper in an aircraft.

* * * * *